United States Patent
Oohinata et al.

(10) Patent No.: US 9,360,113 B2
(45) Date of Patent: Jun. 7, 2016

(54) SEALING MATERIAL AND METHOD FOR PRODUCING SAME

(71) Applicant: NICHIAS CORPORATION, Tokyo (JP)

(72) Inventors: Tetsuo Oohinata, Tokyo (JP); Kenichiro Ishikawa, Tokyo (JP); Atsushi Omura, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/381,876

(22) PCT Filed: Feb. 28, 2013

(86) PCT No.: PCT/JP2013/055479
§ 371 (c)(1),
(2) Date: Aug. 28, 2014

(87) PCT Pub. No.: WO2013/129596
PCT Pub. Date: Sep. 6, 2013

(65) Prior Publication Data
US 2015/0014946 A1 Jan. 15, 2015

(30) Foreign Application Priority Data
Feb. 28, 2012 (JP) .................. 2012-041271

(51) Int. Cl.
*F16J 15/02* (2006.01)
*C08J 9/06* (2006.01)
(Continued)

(52) U.S. Cl.
CPC ............... *F16J 15/022* (2013.01); *B29C 44/12* (2013.01); *B32B 15/046* (2013.01); *C08J 7/08* (2013.01);
(Continued)

(58) Field of Classification Search
CPC .............. B32B 15/046; B32B 2266/08; B32B 2581/00; C08J 9/06; C08J 9/12; C08J 2201/026; C08J 2205/052; Y10T 428/24999
See application file for complete search history.

(56) References Cited

U.S. PATENT DOCUMENTS

2002/0063394 A1* 5/2002 Furuta ................... F02F 11/002
277/591
2004/0138321 A1* 7/2004 Hashimoto ............. B60R 13/08
521/134

(Continued)

FOREIGN PATENT DOCUMENTS

JP        A-7-286165        10/1995
JP        A-2002-161805     6/2002

(Continued)

OTHER PUBLICATIONS

International Search Report issued in International Application No. PCT/JP2013/055479 on Apr. 23, 2013 (with translation).

(Continued)

*Primary Examiner* — Hai Vo
(74) *Attorney, Agent, or Firm* — Oliff PLC (57) ABSTRACT

Provided is a sealing material that exhibits excellent sealing property at a low contact pressure and a method for producing the same. A sealing material according to the present invention is a sealing material including a metal plate and a foamed rubber layer formed on one surface, or each of both surfaces, of the metal plate, in which the foamed rubber layer has a closed cell rate of 50% or more, and a surface of the foamed rubber layer has a maximum height determined by a method in conformity to JIS B 0601-2001 of 40 μm or less.

11 Claims, 5 Drawing Sheets

(51) Int. Cl.
  *F16J 15/12* (2006.01)
  *F16J 15/14* (2006.01)
  *B32B 15/04* (2006.01)
  *C08J 9/00* (2006.01)
  *B29C 71/02* (2006.01)
  *C08J 7/12* (2006.01)
  *C08J 9/12* (2006.01)
  *B29C 44/12* (2006.01)
  *C09K 3/10* (2006.01)
  *B29K 105/04* (2006.01)

(52) U.S. Cl.
  CPC  *C08J 7/12* (2013.01); *C08J 9/0066* (2013.01); *C08J 9/06* (2013.01); *C08J 9/12* (2013.01); *C09K 3/1006* (2013.01); *F16J 15/12* (2013.01); *F16J 15/14* (2013.01); *B29K 2105/046* (2013.01); *B29K 2995/0097* (2013.01); *B32B 2250/40* (2013.01); *B32B 2266/0207* (2013.01); *B32B 2266/0292* (2013.01); *B32B 2266/08* (2013.01); *B32B 2307/716* (2013.01); *B32B 2581/00* (2013.01); *C08J 2201/026* (2013.01); *C08J 2205/052* (2013.01); *C08J 2309/00* (2013.01); *C08J 2309/02* (2013.01); *C09K 2200/0612* (2013.01)

(56) References Cited

U.S. PATENT DOCUMENTS

| | | | |
|---|---|---|---|
| 2005/0080150 | A1 | 4/2005 | Nakahama et al. |
| 2006/0093780 | A1 | 5/2006 | Hamada et al. |
| 2007/0084127 | A1 | 4/2007 | Muraoka et al. |
| 2008/0110102 | A1 | 5/2008 | Hotta et al. |
| 2012/0277337 | A1* | 11/2012 | Kawata ............... C08J 3/24 521/150 |

FOREIGN PATENT DOCUMENTS

| | | |
|---|---|---|
| JP | 2004-035800 A | 2/2004 |
| JP | 2006-083236 A | 3/2006 |
| JP | A-2009-49194 | 3/2009 |
| JP | 2009-242624 A | 10/2009 |
| JP | A-2011-74374 | 4/2011 |
| JP | EP 2392609 A1 * | 12/2011 .............. C08J 3/24 |

OTHER PUBLICATIONS

Written Opinion of the International Searching Authority issued in International Application No. PCT/JP2013/055479 on Apr. 23, 2013 (with translation).

Nov. 9, 2015 extended European Search Report issued in European Application No. 13755497.8.

* cited by examiner

[COMPARATIVE EXAMPLE 1-1]

FIG.2B

[EXAMPLE 1-1]

FIG.2C

[COMPARATIVE EXAMPLE 1-2]

FIG.2D

[EXAMPLE 1-2]

FIG.3

| | | COMPARATIVE EXAMPLE 1-1 | EXAMPLE 1-1 | COMPARATIVE EXAMPLE 1-2 | EXAMPLE 1-2 |
|---|---|---|---|---|---|
| FOAMING METHOD | | USUAL | IN MOLD | USUAL | IN MOLD |
| FOAMING AGENT | | THERMALLY-DEGRADABLE | | MICROCAPSULE-TYPE | |
| FOAMED RUBBER LAYER | THICKNESS BEFORE FOAMING | 0.2mm | | | |
| | THICKNESS AFTER FOAMING | 0.86mm | 0.57mm | 0.85mm | 0.61mm |
| | CLOSED CELL RATE | 23% | 85% | 98% | 100% |
| | MAXIMUM HEIGHT Rz | 61 μm | 19 μm | 100 μm | 39 μm |
| MINIMUM SEAL CONTACT PRESSURE | | 1.0MPa | 0.4MPa | 1.0MPa | 0.4MPa |
| STRESS RELAXATION RATE | | 21% | 21% | 31% | 35% |

FIG.4A

[COMPARATIVE EXAMPLE 2]

FIG.4B

[EXAMPLE 2]

FIG.5

| | COMPARATIVE EXAMPLE 2 | EXAMPLE 2 |
|---|---|---|
| FOAMING METHOD | USUAL | PRELIMINARY CROSS-LINKING |
| FOAMING AGENT | THERMALLY-DEGRADABLE | |
| FOAMED RUBBER LAYER — THICKNESS BEFORE FOAMING | 0.15mm | |
| FOAMED RUBBER LAYER — THICKNESS AFTER FOAMING | 0.33mm | 0.29mm |
| FOAMED RUBBER LAYER — CLOSED CELL RATE | 61% | 96% |
| FOAMED RUBBER LAYER — MAXIMUM HEIGHT Rz | 52 μm | 22 μm |
| MINIMUM SEAL CONTACT PRESSURE | 1.4MPa | 0.5MPa |
| WATER ABSORPTION RATE | 54% | 20% |
| ADHESIVENESS BETWEEN FOAMED RUBBER LAYER AND BASE MATERIAL (CLASSIFICATION IN CROSS-CUT METHOD) | CLASS 3 | CLASS 1 |

SEALING MATERIAL AND METHOD FOR PRODUCING SAME

TECHNICAL FIELD

The present invention relates to a sealing material and a method for producing the same, and particularly to an improvement in sealing property at a low contact pressure.

BACKGROUND ART

Heretofore, for example, Patent Literature 1 describes a gasket material obtained by forming a foamed rubber layer containing microcapsular foaming particles thermally expanded with a hydrocarbon expansion agent having a low boiling point on at least one surface of a metal plate.

CITATION LIST

Patent Literature

Patent Literature 1: JPH07-286165 A

SUMMARY OF INVENTION

Technical Problem

Meanwhile, in recent years, in hybrid automobiles or electric vehicles that have already been put to practical use, demands for gasket materials have rapidly increased for a portion such as an electrical component protecting case. In many cases, such portion is formed by tightening a pair of flanges having low rigidity with small bolts. Therefore, the gasket to be used at the portion is required to exhibit sufficient sealing property at a low clamping contact pressure which is generated owing to undulation of the flanges and is generated between pitches of the bolts.

However, when a conventional gasket material is used at such low contact pressure portion, the sufficient sealing property is not necessarily achieved. In addition, an inexpedience due to insufficient adhesiveness between a metal plate and a foamed rubber layer may be caused. That is, for example, when a fluid to be sealed permeates between the metal plate and the foamed rubber layer, the adhesiveness between the metal plate and the foamed rubber layer may be lowered, resulting in deterioration of the sealing property.

The present invention has been made in view of the problems, and one of the objects of the present invention is to provide a sealing material that exhibits excellent sealing property at a low contact pressure and a method for producing the same.

Solution to Problem

A sealing material according to one embodiment of the present invention for solving the problems is a sealing material including a metal plate and a foamed rubber layer formed on one surface, or each of both surfaces, of the metal plate, in which the foamed rubber layer has a closed cell rate of 50% or more, and a surface of the foamed rubber layer has a maximum height Rz determined by a method in conformity to JIS B 0601-2001 of 40 μm or less. According to the present invention, there is provided a sealing material that exhibits excellent sealing property at a low contact pressure.

In addition, a result obtained by a test of a cross-cut method in conformity to JIS K5600-5-6 after immersion in water may correspond to Class 0, Class 1, or Class 2. In addition, the foamed rubber layer may be formed by foaming a rubber composition layer including a thermally-degradable foaming agent. In addition, the foamed rubber layer may be formed by heating a rubber composition layer formed on the one surface, or each of the both surfaces, of the metal plate at a temperature equal to or higher than a cross-linking temperature and lower than a foaming temperature, and then heating the rubber composition layer at a temperature equal to or higher than the foaming temperature.

A method for producing a sealing material according to one embodiment of the present invention for solving the problems is a method for producing a sealing material including a metal plate and a foamed rubber layer formed on one surface, or each of both surfaces, of the metal plate, the method including a step of heating a rubber composition layer formed on the one surface, or each of the both surfaces, of the metal plate at a temperature equal to or higher than a cross-linking temperature and lower than a foaming temperature, followed by heating of the rubber composition layer at a temperature equal to or higher than the foaming temperature to form the foamed rubber layer. According to the present invention, there is provided a method for producing a sealing material that exhibits excellent sealing property at a low contact pressure. In addition, in the method, the rubber composition layer may contain a thermally-degradable foaming agent.

Advantageous Effects of Invention

According to the present invention, there are provided a sealing material that exhibits excellent sealing property at a low contact pressure and a method for producing the same.

DESCRIPTION OF EMBODIMENTS

Hereinafter, one embodiment of the present invention is described. It should be noted that the present invention is not limited to this embodiment.

Figure 1:
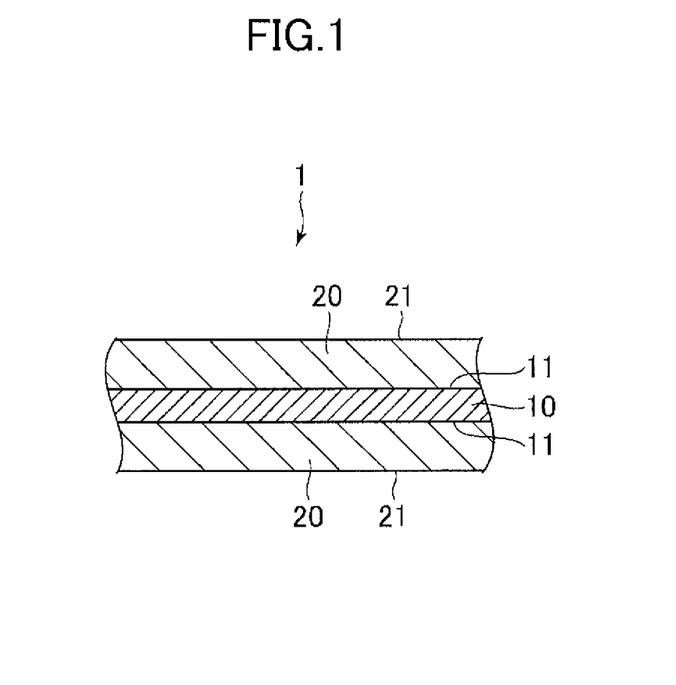
FIG. 1 is an explanatory diagram showing a partial cross-section of an example of a sealing material according to one embodiment of the present invention.

FIG. 1 is an explanatory diagram schematically illustrating a partial cross-section of a sealing material 1 according to this embodiment. As illustrated in FIG. 1, the sealing material 1 includes a metal plate 10 and foamed rubber layers 20 formed on both surfaces 11 of the metal plate 10. More specifically, in the example illustrated in FIG. 1, the sealing material 1 is constituted of the metal plate 10 and the foamed rubber layers 20. It should be noted that the sealing material 1 is not limited to the example illustrated in FIG. 1, and may include the metal plate 10 and the foamed rubber layer 20 formed on only one surface 11 of the metal plate 10.

The kind of the metal that constitutes the metal plate 10 is not particularly limited, and there may be preferably used, for example, a steel plate such as a stainless-steel plate, a steel plate cold commercial (SPCC), or an aluminum steel plate. The thickness of the metal plate 10 is not particularly limited, and may be from 0.1 to 0.3 mm, for example. When the thickness of the metal plate 10 is less than 0.1 mm, its handling properties such as portability or assembling property may deteriorate because the sealing material 1 has low rigidity. When the thickness of the metal plate 10 exceeds 0.3 mm, the weight and cost of the sealing material 1 increase and the metal plate may be inappropriate for reductions in size and weight of a hybrid automobile or an electric vehicle, for example.

In a case where the sealing material 1 including the metal plate 10 is used for sealing a flange, for example, the sealing material can be subjected to punching processing depending on the shape of the flange and has excellent handling properties.

Further, for example, even in a case where a width of a surface to be sealed becomes small owing to a reduction in thickness and/or size of the flange, the sealing material 1 including the metal plate 10 can be subjected to punching processing in a small width for example, 2 mm) corresponding to the surface to be sealed.

The foamed rubber layer 20 is formed by applying a rubber composition including a rubber polymer, a cross-linking agent, and a foaming agent to the surface 11 of the metal plate 10 and performing foaming. The rubber polymer in the foamed rubber layer 20 is not particularly limited, and for example, a synthetic rubber polymer may be preferably used. As the synthetic rubber, there may be preferably used one or more kinds selected from a group consisting of, for example, nitrile rubber (NBR), hydrogenated nitrile rubber (H-NBR), butadiene rubber (BR), styrene-butadiene rubber (SBR), ethylene-propylene rubber (FPM or EPDM), and fluororubber (FKM or FFKM).

The amount of the rubber polymer in the foamed rubber layer 20 is not particularly limited as long as the foamed rubber layer 20 has a desired rubber elasticity. The foamed rubber layer 20 may include, for example, 20 wt % or more of the rubber polymer, or 30 wt % or more of the rubber polymer. The upper limit of the content of the rubber polymer in the foamed rubber layer 20 is not particularly limited, and the foamed rubber layer 20 may include 90 wt % or less of the rubber polymer, for example. That is, the foamed rubber layer 20 may include, for example, from 20 to 90 wt % of the rubber polymer, or from 30 to 90 wt % of the rubber polymer. Further, the foamed rubber layer 20 may include, for example, from 20 to 80 wt % of the rubber polymer, or from 30 to 80 wt % of the rubber polymer.

The foamed rubber layer 20 may further include other component in addition to the rubber polymer. That is, the foamed rubber layer 20 may include a filler, for example. The filler is not particularly limited as long as the filler improves properties (for example, compressibility, deformation resistance, and foaming property) of the sealing material 1. For example, one or more kinds selected from a group consisting of carbon black, calcium carbonate, silica, clay, and talc may preferably be used. Further, the foamed rubber layer 20 may include one or more kinds of additives selected from a group consisting of a tackifier, an antioxidant, and a wax.

The thickness of the foamed rubber layer 20 is not particularly limited and may be, for example, from 0.1 to 1.0 mm, or from 0.1 to 0.6 mm. When the thickness of the foamed rubber layer 20 is too small, the foamed rubber layer 20 may have an insufficient compressive elasticity to lower conformity of the sealing material 1 to a target surface to be sealed (for example, the surface of the flange), resulting in deterioration of the sealing property. Further, when the thickness is too large, the foamed rubber layer 20 may have an insufficient strength.

Further, in the example illustrated in FIG. 1, the foamed rubber layer 20 is formed as a single layer on the surface 11 of the metal plate 10. That is, for example, the foamed rubber layer 20 formed on one surface 11 of the metal plate 10 is a single layer formed by applying a rubber composition to the surface 11 to form a single rubber composition layer and foaming the rubber composition layer. Therefore, in the example illustrated in FIG. 1, a surface on the side of the foamed rubber layer 20 closer to the metal plate 10 adheres to the surface 11 of the metal plate 10, and a surface 21 on the side of the foamed rubber layer 20 opposite to the metal plate 10 is the outermost surface of the sealing material 1.

Such sealing material 1 including the metal plate 10 and the foamed rubber layer 20 is preferably used for various applications such as gaskets. That is, the sealing material 1 may be, for example, a gasket material for constituting a part of a gasket.

Further, in the sealing material 1, the foamed rubber layer 20 has a closed cell rate of 50% or more, and the surface 21 of the foamed rubber layer 20 has a maximum height Rz determined by a method in conformity to JIS B 0601-2001 of 40 µm or less.

Because the closed cell rate of the foamed rubber layer 20 is 50% or more, the permeation of a fluid to be sealed in the foamed rubber layer 20 is effectively prevented. The closed cell rate of the foamed rubber layer 20 is preferably 60% or more, more preferably 70% or more, particularly preferably 80% or more.

Because the maximum height Rz of the surface 21 of the foamed rubber layer 20 is 40 µm or less, the surface 21 effectively and tightly adheres to a portion to be sealed for example, the surface of a flange). Therefore, even when the sealing material 1 is used at a relatively low clamping contact pressure (for example, from 0.2 MPa to 2 MPa), the sealing material exhibits excellent sealing property.

Further, the sealing material 1 may provide a result corresponding to Class 0, Class 1, or Class 2 when the sealing material is immersed in water and is then tested by a cross-cut method in conformity to JIS K5600-5-6.

That is, firstly, the sealing material 1 is immersed in water. As a result, water permeates the foamed rubber layer 20 of the sealing material 1 in an amount corresponding to the closed cell rate of the foamed rubber layer 20. Next, adhesiveness between the metal plate 10 and foamed rubber layer 20 of the sealing material 1 taken out from water is tested by a cross-cut method specified in JIS K5600-5-6. The test result corresponds to Class 0, Class 1, or Class 2 of 6 kinds of Classes (Classes 0 to 5) shown in Table 1 of JIS K5600-5-6.

More specifically, firstly, a sample (for example, 25 mm×100 mm) of the sealing material 1 is prepared and the sample is immersed in water at a predetermined temperature (for example, 90° C.) for a predetermined time (for example, 24 hours).

Next, the sample is tested by the cross-cut method specified in JIS K5600-5-6. That is, cuts (cross-cuts) arriving on the surface 11 of the metal plate 10 from the surface 21 of the foamed rubber layer 20 are formed on the foamed rubber layer 20 using a predetermined cutting tool (cutter) so that a predetermined number (for example, 100) of grids each having a predetermined size (for example, 2 mm squares) are formed on the surface 21 of the foamed rubber layer 20 of the sample after the immersion in water.

Further, a predetermined transparent pressure-sensitive adhesive tape is attached on the part where the cuts are formed (cross-cut part) on the surface 21 of the foamed rubber layer 20. After that, the adhesive tape is peeled off from the surface 21 of the foamed rubber layer 20. Then, the state of the cross-cut part on the surface 21 of the foamed rubber layer 20 after the peeling of the adhesive tape is visually observed.

The observation results (that is, the results of the test by the cross-cut method) correspond to "Class 0" in a case where "cut edges are completely smooth, and all grids are not peeled", "Class 1" in a case where "the ratio of affected grids in the cross-cut part does not clearly exceed 5%", or "Class 2" in a case where "the ratio of affected grids in the cross-cut part clearly exceeds 5% but does not exceed 15%" as specified in JIS K5600-5-6.

It should be noted that JIS K5600-5-6 also specifies that the observation results correspond to "Class 3" in a case where "the ratio of affected grids in the cross-cut part clearly exceeds 15% but does not exceed 35%", "Class 4" in a case where "the ratio of affected grids in the cross-cut part clearly exceeds 35% but does not exceed 65%", or "Class 5" in a case where "the peeling degree exceeds that of Class 4".

Even after the immersion of the sealing material 1 in water, the adhesiveness between the metal plate 10 and the foamed rubber layer 20 is maintained at so high level as to obtain a result of the test by the cross-cut method corresponding to Class 0, Class 1, or Class 2.

Therefore, for example, even when the sealing material 1 is used at a relatively low clamping contact pressure, the sealing material exhibits excellent sealing property because the sealing material 1 effectively avoids the permeation of a fluid to be sealed between the metal plate 10 and the foamed rubber layer 20, and effectively maintains high adhesiveness between the metal plate 10 and the foamed rubber layer 20.

As described above, the foamed rubber layer 20 is formed by foaming the rubber composition on the surface 11 of the metal plate 10. That is, firstly, the rubber composition including the rubber polymer, the cross-linking agent, and the foaming agent is prepared, and then the rubber composition is applied to the surface 11 of the metal plate 10 to form the rubber composition layer. After that, the rubber composition layer is subjected to treatment such as heating to perform cross-linking and foaming.

The foaming agent is not particularly limited as long as the agent enables formation of the foamed rubber layer 20 by foaming the rubber composition, and for example, a thermally-degradable foaming agent or a microcapsule-type foaming agent may be used.

That is, the foamed rubber layer 20 may be formed by foaming the rubber composition layer including the thermally-degradable foaming agent. The thermally-degradable foaming agent is a foaming agent that degrades by heating to generate a gas. The thermally-degradable foaming agent is not particularly limited, and an organic thermally-degradable foaming agent and/or an inorganic thermally-degradable foaming agent may be used, and an organic thermally-degradable foaming agent capable of generating a relatively large amount of a gas may be preferably used.

Specifically, as the organic thermally-degradable foaming agent, for example, one or more kinds selected from a group consisting of a dinitrosopentamethylenetetramine (DPT)-based foaming agent, an azodicarbonamide (ADCA)-based foaming agent, a p,p'-oxybisbenzenesulfonylhydrazide (OBSH)-based foaming agent, and a hydrazodicarbonamide (HDCA)-based foaming agent may be used. As the inorganic thermally-degradable foaming agent, for example, sodium hydrogen carbonate may be used.

In addition, the foamed rubber layer 20 may be formed by foaming the rubber composition layer including the microcapsule-type foaming agent. The microcapsule-type foaming agent is a foaming agent having an expandable outer shell and a thermally expandable substance (for example, a hydrocarbon) encapsulated in the outer shell. The outer shell of the microcapsule-type foaming agent is constituted of, for example, a thermoplastic resin such as an acrylic-based resin.

When the foamed rubber layer 20 is formed by foaming the rubber composition layer including the thermally-degradable foaming agent, the foamed rubber layer 20 has excellent adhesiveness to a portion to be sealed and exhibits excellent sealing property because the foamed rubber layer 20 exhibits excellent flexibility and has small stress relaxation.

That is, when the foamed rubber layer 20 is formed by foaming the rubber composition layer including the microcapsule-type foaming agent, the resin outer shell of the microcapsule-type foaming agent inevitably remains in the foamed rubber layer 20. Therefore, the foamed rubber layer 20 is relatively hard, and, when heated, causes stress relaxation (for example, deformation) due to the softening of the outer shell.

On the other hand, the foamed rubber layer 20 formed by foaming the rubber composition layer including the thermally-degradable foaming agent does not cause the problem in such case of use of the microcapsule-type foaming agent as described above. It should be noted that, in general, in a case where there is no outer shell of the microcapsule-type foaming agent in the foamed rubber layer 20, the foamed rubber layer 20 is considered to be formed by foaming using the thermally-degradable foaming agent.

The foamed rubber layer 20 may be formed by heating the rubber composition layer formed on the surface 11 of the metal plate 10 at a temperature equal to or higher than a cross-linking temperature and lower than a foaming temperature (hereinafter referred to as "primary heating temperature"), and then heating the rubber composition layer at a temperature equal to or higher than the foaming temperature (hereinafter referred to as "secondary heating temperature").

That is, in this case, the foamed rubber layer 20 is formed by a primary step of heating the rubber composition layer at the primary heating temperature to selectively proceed cross-linking substantially without foaming the rubber composition layer and a secondary step of heating the rubber composition layer at the secondary heating temperature higher than the primary heating temperature to generate a foaming gas and to further proceed the cross-linking.

As described above, the rubber composition layer is formed by applying the rubber composition including the rubber polymer, the cross-linking agent, and the foaming agent to the surface 11 of the metal plate 10. The cross-linking agent is not particularly limited as long as the agent causes the cross-linking of the rubber polymer, and for example, one or more kinds selected from a group consisting of sulfur, an amine-based cross-linking agent, a polyol-based cross-linking agent, a quinoid-based cross-linking agent, and a bismaleimide-based cross-linking agent may be used. The foaming agent having a foaming temperature higher than the cross-linking temperature is used. It should be noted that, in general, the foaming temperature of the thermally-degradable foaming agent is equal to or higher than the degradation temperature of the agent.

The temperature equal to or higher than the cross-linking temperature is such a temperature that cross-linking is performed in the rubber composition layer by heating the rubber composition layer at the temperature. The temperature less than the foaming temperature is such a temperature that the rubber composition layer is not substantially foamed even when the rubber composition layer is heated at the temperature. The temperature is, for example, a temperature for maintaining an expansion ratio of the rubber composition layer at less than 1.5 times. It should be noted that the temperature for maintaining the expansion ratio of the rubber composition layer at less than 1.5 times is a temperature at which the volume of the rubber composition layer is maintained at less than 1.5 times, and at which the volume of the rubber composition layer does not increase 1.5-fold or more.

The temperature equal to or larger than the foaming temperature is such a temperature that the rubber composition layer is substantially foamed by heating the rubber composition layer at the temperature. The temperature is, for example, a temperature at which the expansion ratio of the rubber composition layer is 1.5 times or more (a temperature at which the volume of the rubber composition layer increases 1.5-fold or more).

The primary heating temperature is not particularly limited as long as the temperature is equal to or higher than the cross-linking temperature and less than the foaming temperature, and may be a temperature in the range of from 130 to 160° C., for example. The secondary heating temperature is not particularly limited as long as the temperature is equal to or higher than the foaming temperature, and may be, for example, a temperature in the range of from 200 to 230° C. and higher than the primary heating temperature.

In the primary step, the rubber composition layer is heated at the primary heating temperature to proceed preliminary cross-linking (for example, partial cross-linking) before substantial foaming of the rubber composition layer. Then, in the subsequent secondary step, the preliminarily cross-linked rubber composition layer is heated at the secondary heating temperature to proceed substantial foaming of the rubber composition layer and to further proceed the cross-linking, thereby forming the foamed rubber layer 20.

According to such two-step method including the primary step and the secondary step, such sealing material 1 having the foamed rubber layer 20 including the cell structure having a high closed cell rate and the smoothed surface 21 as described above is effectively produced. Further, a precise cell structure is formed in the foamed rubber layer 20. In addition, as described above, the sealing material 1 excellent in adhesiveness between the metal plate 10 and the foamed rubber layer 20 is effectively produced.

The foamed rubber layer 20 may be formed by foaming, in a mold, the rubber composition layer formed on the surface 11 of the metal plate 10. That is, in this case, the metal plate 10 including the rubber composition layer formed on the surface 11 is arranged in the mold, and the rubber composition layer is foamed in the mold. Specifically, for example, the metal plate 10 having formed thereon an unfoamed rubber composition layer is arranged in the mold, and then the rubber composition layer is foamed so that the surface (that is, the surface 21 of the foamed rubber layer 20) of the rubber composition layer after foaming contacts with the inner surface of the mold. Then, the surface 21 of the foamed rubber layer 20 is peeled off from the inner surface of the mold to obtain the sealing material 1 having the foamed rubber layer 20.

It should be noted that the method requires use of a special apparatus equipped with a mold, but the two-step method including preliminary cross-linking described above eliminates the need for the use of the special apparatus to enables simple and efficient production of the sealing material 1 excellent in sealing property. In addition, for example, when the amount of the foaming agent used is large in foaming in the mold, the pressure of a foaming gas generated between the metal plate 10 and the foamed rubber layer 20 may peel the foamed rubber layer 20 off from the metal plate 10. Further, for example, the foaming gas confined in the foamed rubber layer 20 may form large cells on its surface at the time of opening of the mold. Therefore, it is necessary to set conditions of the foaming to appropriate ones. On the other hand, the two-step method including the preliminary cross-linking and the sealing material 1 produced by the two-step method do not cause such problems as described above occurring when foaming is performed in the mold.

The foamed rubber layer 20 may be formed by foaming a rubber composition layer having a thickness of 0.2 mm or less. That is, in this case, firstly, a thin rubber composition layer having a thickness of 0.2 mm or less is formed on the surface 11 of the metal plate 10, and then the rubber composition layer is foamed to form the foamed rubber layer 20. It should be noted that the thickness of the rubber composition layer before foaming in this case is not particularly limited, and may be 0.05 mm or more, for example.

When the thickness of the rubber composition layer before foaming becomes large, the amount of a solvent in the rubber composition layer (for example, a liquid rubber composition layer containing a solvent such as toluene) inevitably increases. As a result, the time for drying the rubber composition layer becomes longer. When the time for drying the rubber composition layer becomes longer, the production time and cost increase. That is, when the time for drying the rubber composition layer becomes longer, unnecessary bubbles may appear on the surface of the rubber composition layer during the drying. In this case, the sealing property and external appearance of the sealing material 1 to be finally formed may be unfavorably affected. In addition, when the temperature for drying is raised to reduce the drying time, unnecessary bubbles may appear on the surface of the rubber composition layer by rapid drying, resulting in the occurrence of unfavorable effects on the sealing property and external appearance of the sealing material 1.

On the other hand, when the thickness of the rubber composition layer before foaming is 0.2 mm or less, the rubber composition layer (for example, a liquid rubber composition layer containing a solvent such as toluene) is rapidly dried in a short time. Therefore, the generation of such unnecessary bubbles as described above is effectively avoided, and the sealing material 1 excellent in sealing property and external appearance is reliably produced.

It should be noted that the thickness of the rubber composition layer before foaming is determined as, for example, the thickness of the foamed rubber layer 20 of the sealing material 1 after the foamed rubber layer 20 is compressed until its thickness does not vary.

Next, specific examples according to this embodiment are described.

EXAMPLE 1

[Formation of Rubber Composition Layer]

Firstly, a rubber composition including a rubber polymer, a cross-linking agent, and a foaming agent was prepared. That is, 100.0 parts by weight of a primary NBR polymer (JSRN234L, manufactured by JSR Corporation), 12.5 parts by weight of a secondary NBR polymer (Nipol 1312, manufactured by Japan Zeon Corporation), 50.0 parts by weight of carbon black (MT carbon, manufactured by Cabot Corporation), 5.0 parts by weight of two kinds of zinc oxide, 0.5 part by weight of stearic acid, 11.5 parts by weight of an antioxidant, and 2.5 parts by weight of a tackifier were mixed to prepare 182.5 parts by weight of a rubber compound.

Next, 182.5 parts by weight of the rubber compound, 2.0 parts by weight of a cross-linking agent (sulfur), 12.0 parts by weight of a thermally-degradable foaming agent (CAP250, manufactured by SANKYO KASEI Co., Ltd.) or 12.0 parts by weight of a microcapsule-type foaming agent (920DU80, manufactured by Japan Fillite Co., Ltd.), and 4.4 parts by weight of a cross-linking promoter were mixed to prepare 200.4 parts by weight of a rubber composition.

Further, 319.8 parts by weight of toluene were mixed as a solvent in 200.4 parts by weight of the rubber composition to prepare a coating liquid having a solid concentration of 38 wt %.

Meanwhile, both surfaces of a metal plate (SPCC, thickness: 0.15 mm) were defatted, and the surfaces were coated with a primer (a primer solution obtained by dissolving a novolac phenol-type phenol resin in methyl ethyl ketone at a dilution rate of 5%) by a dipping method, followed by treatment at 160° C. for 3 minutes.

Then, each surface of the metal plate was coated with the coating liquid including the rubber composition and was dried to form a rubber composition layer. The thickness of the rubber composition layer formed on one surface (thickness before foaming) was 0.2 mm. The thickness of the rubber composition layer was measured using a commercially available device (dial gauge DG-925, manufactured by ONO SOKKI CO., LTD.) as a thickness of the rubber composition layer (a length between the surface of the metal plate and the surface of the rubber composition layer) in a state where 10 g of a load was applied on the surface of the rubber composition layer using a compression instrument (diameter: 10 mm).

COMPARATIVE EXAMPLE 1-1

A sealing material according to Comparative Example 1-1 was produced by a usual method. That is, the metal plate 10 where the rubber composition layers each including the thermally-degradable foaming agent are formed on its both surfaces was arranged in an oven and was heated at 210° C. for 10 minutes to perform the cross-linking and foaming of the rubber composition layers, thereby the sealing material according to Comparative Example 1-1 was obtained.

COMPARATIVE EXAMPLE 1-2

In the same manner as in Comparative Example 1-1 above, the metal plate 10 where the rubber composition layers each including the microcapsule-type foaming agent are formed on its both surfaces was heated in the oven to obtain a sealing material according to Comparative Example 1-2.

EXAMPLE 1-1

The rubber composition layers were foamed in a mold to produce a sealing material according to Example 1-1. That is, the metal plate 10 where the rubber composition layers each including the thermally-degradable foaming agent are formed on its both surfaces was arranged in a mold having a 1.5-mm void adjusted by a spacer.

Then, the mold was heated at 210° C. for 10 minutes in a state of being tightened at a predetermined contact pressure using a press machine to perform the cross-lining and foaming of the rubber composition layers, thereby the sealing material according to Example 1-1 was obtained.

EXAMPLE 1-2

In the same manner as in Example 1-1 above, the metal plate 10 where the rubber composition layers each including the microcapsule-type foaming agent are formed on its both surfaces was heated in the mold to obtain a sealing material according to Example 1-2.

[Thickness of Foamed Rubber Layer]

The thickness (thickness after foaming) of the foamed rubber layer formed on one side of the sealing material was measured in the same manner as that for the thickness before foaming described above.

[Maximum Height Rz]

The maximum height Rz of the surface of the foamed rubber layer of the sealing material was measured by a method in conformity to JIS B 0601-2001 using a commercially available surface roughness/shape measuring apparatus (SURFCOM 130A, manufactured by TOKYO SEIMITSU CO., LTD.).

That is, firstly, an indenter (sensing pin) for measurement was pulled down on the surface of the foamed rubber layer. Then, the indenter was moved at a rate of 0.6 m/min in a range of 4-mm length to measure the maximum height Rz in the range.

[Closed Cell Rate]

The closed cell rate of the foamed rubber layer was measured. That is, firstly, a sample (30 mm×30 mm) was cut out from the sealing material, and the weight of the sample (weight before immersion in water) was measured. Subsequently, the sample was immersed in water and was depressurized to vacuum. The depressurization to vacuum was performed until the weight of the sample after immersion in water became constant. After that, the sample was taken out from water, and the weight (weight after immersion in water) of the sample was measured.

Then, the volume of water that permeated the foamed rubber layer was determined by the following equation: volume ($cm^3$) of water that permeated foamed rubber layer= (weight (g) after immersion in water−weight (g) before immersion in water)/specific gravity of water (1 $g/cm^3$). It should be noted that the volume of water that permeated the foamed rubber layer corresponds to the volume of open cells of the foamed rubber layer.

Meanwhile, the volume of all cells in the foamed rubber layer (the sum of the volume of open cells and the volume of closed cells) was determined by the following equation: volume of all cells in foamed rubber layer=volume of foamed rubber layer−volume of rubber composition layer before foaming (calculated based on thickness of the rubber composition layer before foaming). It should be noted that the volume of the foamed rubber layer was calculated by multiplying the thickness of the foamed rubber layer by the area of the layer (30 mm×30 mm). The volume of the rubber composition layer before foaming was calculated by multiplying the thickness of the rubber composition layer before foaming by the area of the layer (30 mm×30 mm).

Then, the closed cell rate of the foamed rubber layer was determined by the following equation: closed cell rate (%)= (volume of all cells in foamed rubber layer-volume of water that permeated foamed rubber)/volume of all cells in foamed rubber×100.

[Minimum Seal Contact Pressure]

The minimum seal contact pressure was measured as an index indicating the sealing property of the sealing material. The minimum seal contact pressure represents the minimum value of clamping contact pressures at which a fluid to be sealed does not leak. That is, the sealing material prevents the leakage of a fluid to be sealed at a clamping contact pressure equal to or larger than the minimum seal contact pressure.

Therefore, when a sealing material has a smaller minimum seal contact pressure, the sealing material exhibits higher sealing property at a low clamping contact pressure. That is, a smaller minimum seal contact pressure means more excellent sealing property at a low contact pressure.

Air was used as the fluid to be sealed. As a member to be sealed, there was used a pair of cylindrical flanges (diameter: 60 mm, thickness: 30 mm) manufactured by SUS Corporation, each including a through hole for passing a bolt hole formed in its center.

Firstly, a sealing material and a spacer were arranged between the pair of flanges so as to achieve a clamping contact pressure of 0.2 MPa, and the flanges were tightened. Subsequently, the inner pressure of the flanges was raised up to 100 kPa. Then, it was examined whether air was leaked when the inner pressure was maintained at 100 kPa for 1 minute. The presence or absence of the leakage was examined by applying an aqueous solution containing a surfactant to the outer peripheries of the flanges and observing whether bubbles were generated on the outer peripheries of the flanges.

In the case where the leakage was caused, the tightened flanges were released, and the sealing material and the spacer were detached. Subsequently, the sealing material and another spacer for increasing the clamping contact pressure by 0.05 MPa were arranged again between the flanges, and the flanges were tightened. Then, in the same manner as that described above, the inner pressure was maintained at 100 kPa for 1 minute to examine whether the leakage of air was caused.

Thus, the presence or absence of the leakage at various clamping contact pressures was examined while the clamping contact pressure was raised by 0.05 MPa by exchanging the spacer. Then, the clamping contact pressure at which no leakage was caused for the first time was determined as the minimum seal contact pressure (MPa).

[Stress Relaxation Rate]

The stress relaxation rate was measured as another index indicating the sealing property of the sealing material. The stress relaxation rate represents, in a case where the sealing material is tightened at a predetermined clamping contact pressure, a ratio of a decrease in the clamping contact pressure for a period between the start time of tightening and the time after a lapse of a predetermined time.

Therefore, when a sealing material has a smaller stress relaxation rate, the sealing property of the sealing material deteriorates over time to a smaller extent. That is, a smaller stress relaxation rate means more excellent sealing property.

Firstly, a sample (30 mm×30 mm) cut out from the sealing material was set to a commercially available compression tension tester (Autograph AG50kGN, manufactured by Shimadzu Corporation). Subsequently, the sample was compressed at an initial contact pressure of 0.3 MPa and was maintained at 25° C. for 1 hour. After that, the contact pressure was measured 1 hour after the initiation of the compression.

Then, the stress relaxation rate was determined by the following equation: stress relaxation rate=(initial contact pressure-contact pressure measured 1 hour after initiation of compression)/initial contact pressure×100(%).

[Cross-Sectional Picture]

A part of the sealing material was cut, and its cross-section was observed with an optical microscope.

[Results]

Figure 2A:
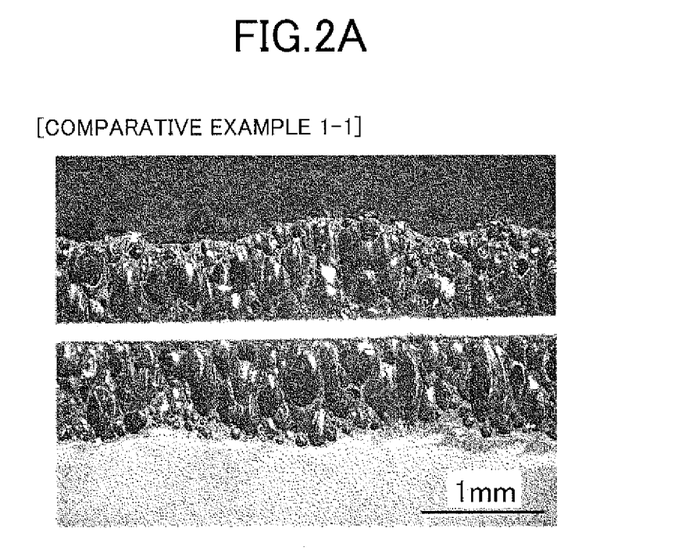
FIG. 2A is an explanatory diagram showing an example of observation results of a cross-section of a sealing material in Example 1 according to one embodiment of the present invention.
Figure 2B:
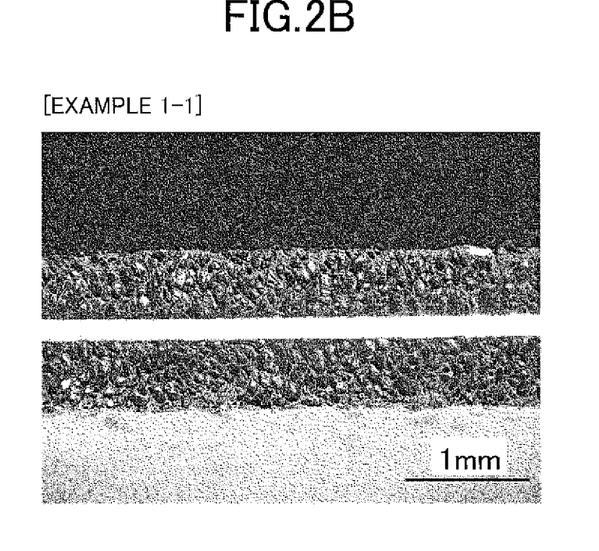
FIG. 2B is an explanatory diagram showing another example of observation results of a cross-section of the sealing material in Example 1 according to one embodiment of the present invention.
Figure 2C:
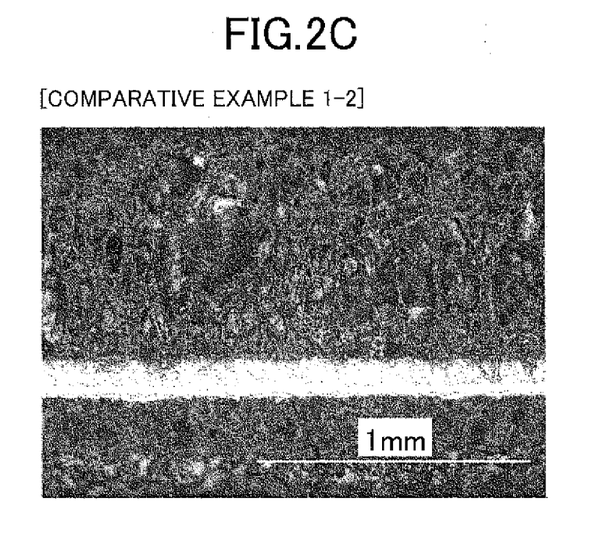
FIG. 2C is an explanatory diagram showing another example of observation results of a cross-section of the sealing material in Example 1 according to one embodiment of the present invention.
Figure 2D:
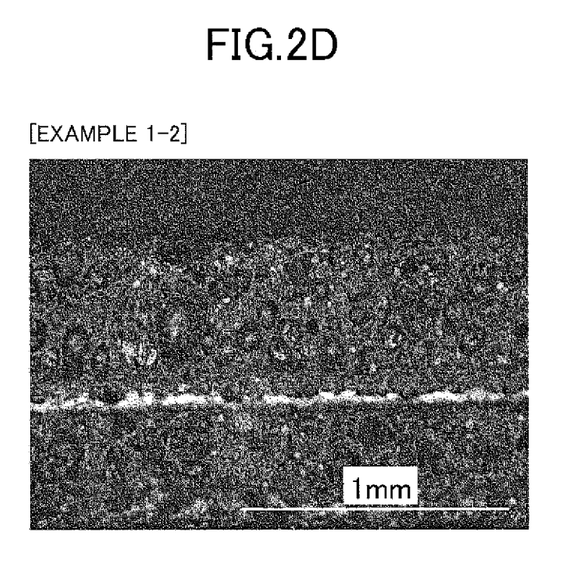
FIG. 2D is an explanatory diagram showing another example of observation results of a cross-section of the sealing material in Example 1 according to one embodiment of the present invention.

FIGS. 2A, 2B, 2C, and 2D show optical micrographs of cross-sections of the sealing materials according to Comparative Example 1-1, Example 1-1, Comparative Example 1-2, and Example 1-2, respectively. As shown in FIGS. 2A to 2D, the foamed rubber layers formed by foaming in the mold (FIGS. 2B and 2D) were found to have more precise cell structures and more smooth surfaces as compared to the foamed rubber layers formed by usual foaming without using the mold (FIGS. 2A and 2C).

Figure 3:
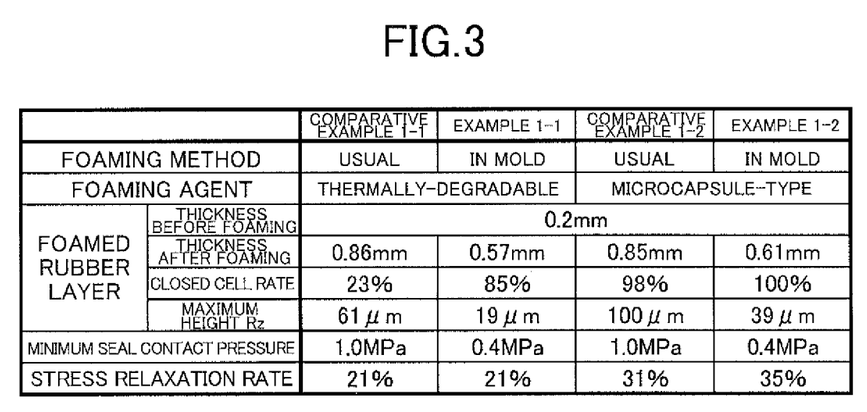
FIG. 3 is an explanatory diagram showing an example of evaluation results of properties of the sealing material in Example 1 according to one embodiment of the present invention.

FIG. 3 shows the foaming methods and foaming agents used for production of the sealing materials as well as the results of evaluations of the thicknesses before and after foaming, closed cell rates, and maximum heights Rz of the foamed rubber layers, and the minimum seal contact pressures and stress relaxation rates of the sealing materials.

As shown in FIG. 3, the thicknesses of the foamed rubber layers according to Examples 1-1 and 1-2 were found to be controlled by using the mold to the predetermined range and to be smaller than those of the foamed rubber layers according to Comparative Examples 1-1 and 1-2.

Further, in the case of using the thermally-degradable foaming agent, the closed cell rate of the foamed rubber layer (Example 1-1) formed by foaming in the mold was found to be significantly higher than that of the foamed rubber layer formed by usual foaming (Comparative Example 1-1). On the other hand, in the cases of using the microcapsule-type foaming agent, the closed cell rates were found to be high regardless of the foaming method.

In addition, the maximum heights Rz of the surfaces of the foamed rubber layers according to Examples 1-1 and 1-2 were found to be significantly lower than those of the foamed rubber layers according to Comparative Examples 1-1 and 1-2. That is, the foaming in the mold significantly smoothed the surfaces of the foamed rubber layers.

Further, the minimum seal contact pressures of the sealing materials according to Examples 1-1 and 1-2 were found to be significantly lower than those of the sealing materials according to Comparative Examples 1-1 and 1-2. That is, foaming in the mold significantly improved the sealing properties of the sealing materials at a low contact pressure.

Further, the stress relaxation rates of the sealing materials produced using the thermally-degradable foaming agent (Comparative Example 1-1 and Example 1-1) were found to be significantly smaller than those of the sealing materials produced using the microcapsule-type foaming agent (Comparative Example 1-2 and Example 1-2).

That is, the sealing materials including the foamed rubber layers formed using the thermally-degradable foaming agent were found to be excellent in sealing property as compared to the sealing materials including the foamed rubber layers formed using the microcapsule-type foaming agent regardless of the foaming method.

EXAMPLE 2

[Formation of Rubber Composition Layer]

Firstly, a rubber composition including a rubber polymer, a cross-linking agent, and a foaming agent was prepared. That is, 100.00 parts by weight of an NBR polymer (Nipol DN 3335, manufactured by Japan Zeon Corporation), 103.78 parts by weight of calcium carbonate heavy (TSS#100, manufactured by Nitta Funka Kogyo K.K.), 3.19 parts by weight of two kinds of zinc oxide, 0.32 part by weight of stearic acid, 4.15 parts by weight of an antioxidant, 1.60 parts by weight of a tackifier, and 0.64 part by weight of a wax were mixed to prepare 213.68 parts by weight of a rubber compound.

Next, 213.68 parts by weight of the rubber compound, 2.25 parts by weight of a cross-linking agent (sulfur), 12.0 parts by weight of a thermally-degradable foaming agent (CELLMIC C-2, manufactured by SANKYO KASEI Co., Ltd.), and 2.38 parts by weight of a cross-linking promoter were mixed to prepare 235.32 parts by weight of a rubber composition.

Further, 380.06 parts by weight of toluene were mixed as a solvent in 235.32 parts by weight of the rubber composition to prepare a coating liquid having a solid concentration of 38 wt %.

Meanwhile, both surfaces of a metal plate (SPCC, thickness: 0.15 mm) were defatted, and the surfaces were coated with a primer (a primer solution obtained by dissolving a novolac phenol-type phenol resin in methyl ethyl ketone at a dilution rate of 5%) by a dipping method, followed by treatment at 160° C. for 3 minutes.

Then, each surface of the metal plate was coated with the coating liquid prepared as described above and was dried to form a rubber composition layer. The thickness of the rubber composition layer (thickness before foaming) was 0.15 mm.

COMPARATIVE EXAMPLE 2

A sealing material according to Comparative Example 2 was produced by a usual method. That is, the metal plate 10 where the rubber composition layers each including the thermally-degradable foaming agent are formed on its both surfaces as described above was arranged in an oven and was heated at 210° C. for 10 minutes to perform the cross-linking and foaming of the rubber composition layers, thereby the sealing material according to Comparative Example 2 was obtained.

EXAMPLE 2

A sealing material according to Example 2 was produced by a two-step method including preliminary cross-linking, that is, by firstly heating a rubber composition layer at a primary heating temperature equal to or higher than a cross-linking temperature and lower than a foaming temperature, and then heating the rubber composition layer at a secondary heating temperature equal to or higher than the foaming temperature.

That is, firstly, the rubber composition layers formed on both surfaces of the metal plate were heated at 160° C. (primary heating temperature) for 8 minutes to perform the preliminary cross-linking of the rubber composition layers. Subsequently, the preliminarily cross-linked rubber composition layers were heated at 210° C. (secondary heating temperature) for 10 minutes to perform the foaming and additional cross-linking of the rubber composition layers, thereby forming foamed rubber layers. Thus, the sealing material according to Example 2 was obtained by the two-step method including the preliminary cross-linking step.

[Water Absorption Rate]

The water absorption rate of the sealing material was measured. That is, firstly, a sample (30 mm×30 mm) was cut out from the sealing material, and the weight of the sample (weight before immersion in water) was measured. Subsequently, the sample was immersed in 90° C.-water for 24 hours. After that, the sample was taken out from water, and the weight of the sample (weight after immersion in water) was measured.

Then, the water absorption rate was determined by the following equation: water absorption rate (%)=(weight of foamed rubber layer after immersion in water−weight of foamed rubber layer before immersion in water)/(weight of foamed rubber layer before immersion in water)×100.

[Adhesiveness between Foamed Rubber Layer and Metal Plate]

The sealing material after immersion in water was tested by a cross-cut method in conformity to JIS K5600-5-6 to evaluate adhesiveness between the foamed rubber layer and the metal plate.

That is, firstly, a sample (30 mm×30 mm) cut out from the sealing material was immersed in 90° C.-water for 24 hours. After that, the sample was taken out from water and the sample was tested by the cross-cut method.

Specifically, cuts (cross-cuts) were formed on the foamed rubber layer from the surface side using a cutter so that 100 grids (2 mm squares) were formed on the surface of the foamed rubber layer of the sample after immersion in water containing water in an amount depending on the closed cell rate.

Subsequently, a transparent pressure-sensitive adhesive tape (Cellotape (trademark) CT405AP-24, manufactured by NICHIBAN CO., LTD.) was attached on the cross-cut part where the cuts were formed on the surface of the foamed rubber layer. After that, the adhesive tape was peeled off from the surface of the foamed rubber layer.

Then, after the peeling-off of the adhesive tape, the state of the cross-cut part on the surface of the foamed rubber layer was observed. Further, which one of 6 kinds of Classes (Classes 0 to 5) shown in Table 1 of JIS K5600-5-6 the observation result corresponded to was evaluated.

[Other Evaluations]

In the same manner as in Example 1 above, measurements of the thickness, closed cell rate, and maximum height Rz of the foamed rubber layer, measurement of the minimum seal contact pressure of the sealing material, and observation of the cross-section were performed.

[Results]

Figure 4A:
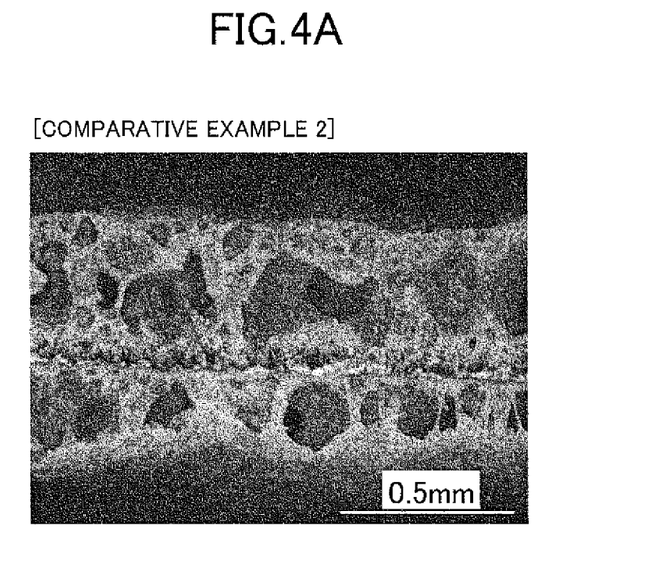
FIG. 4A is an explanatory diagram showing an example of observation results of a cross-section of a sealing material in Example 2 according to one embodiment of the present invention.
Figure 4B:
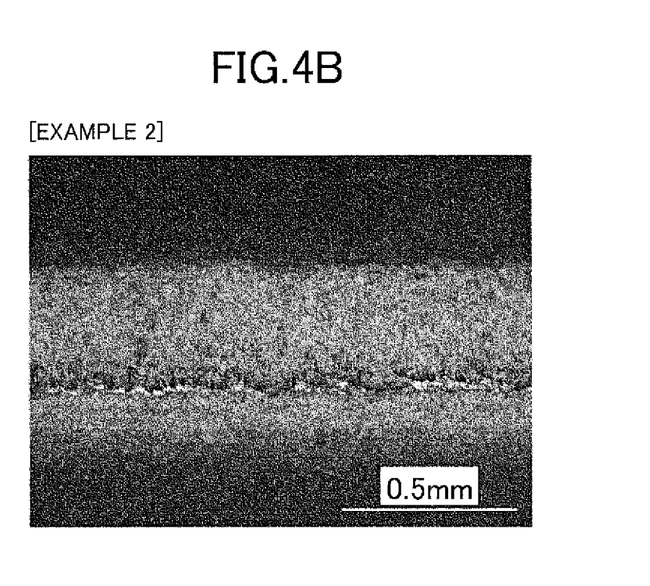
FIG. 4B is an explanatory diagram showing another example of observation results of a cross-section of the sealing material in Example 2 according to one embodiment of the present invention.

FIGS. 4A and 4B show optical micrographs of the cross-sections of the sealing materials according to Comparative Example 2 and Example 2, respectively. As shown in FIGS. 4A and 4B, the foamed rubber layer according to Example 2 (FIG. 4B) formed by the two-step method including the preliminary cross-linking was found to have a more significantly precise cell structure and a more significantly smooth surface as compared to the foamed rubber layer according to Comparative Example 2 (FIG. 4A) formed by the usual method.

Figure 5:
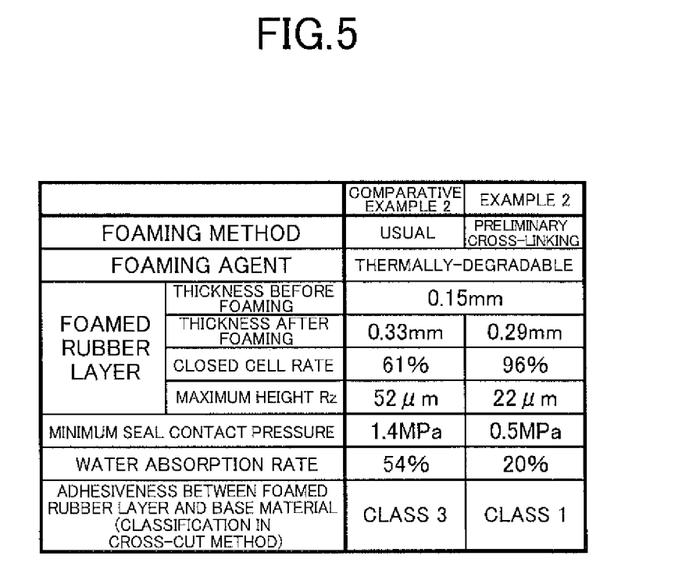
FIG. 5 is an explanatory diagram showing an example of evaluation results of properties of the sealing material in Example 2 according to one embodiment of the present invention.

FIG. 5 shows the foaming methods and the kind of the foaming agent used for production of the sealing materials as well as the results of evaluation of the thicknesses before and after foaming, closed cell rates, and maximum heights Rz of the foamed rubber layers, the minimum seal contact pressures and water absorption rates of the sealing materials, and the adhesiveness between the foamed rubber layer and the metal plate.

As shown in FIG. 5, the thickness of the foamed rubber layer according to Example 2 was found to be lower than that of the foamed rubber layer according to Comparative Example 2. In addition, the closed cell rate of the foamed rubber layer according to Example 2 was found to be significantly higher than that of the foamed rubber layer according to Comparative Example 2.

Further, the maximum height Rz of the surface of the foamed rubber layer according to Example 2 was found to be significantly lower than that of the foamed rubber layer according to Comparative Example 2. That is, the surface of the foamed rubber layer was effectively smoothed by the two-step method including the preliminary cross-linking.

In addition, the minimum seal contact pressure of the sealing material according to Example 2 was found to be significantly lower than that of the sealing material according to Comparative Example 2. That is, the sealing property of the sealing material at a low contact pressure was significantly improved by the two-step method including the preliminary cross-linking.

Further, the water absorption rate of the sealing material according to Example 2 was found to be significantly lower than that of the sealing material according to Comparative Example 2. That is, in the sealing material obtained by the two-step method including the preliminary cross-linking, the permeation of the fluid was effectively suppressed.

Further, the class of the sealing material according to Comparative Example 2 determined by the cross-cut method was found to correspond to "Class 3." That is, in the sealing material according to Comparative Example 2, larger than 15% of the cross-cut part of the foamed rubber layer was damaged.

On the other hand, the class of the sealing material according to Example 2 determined by the cross-cut method was found to correspond to "Class 1." That is, in the sealing material according to Example 2, only 5% or less of the cross-cut part of the foamed rubber layer was damaged.

As described above, even after the sealing material obtained by the two-step method including the preliminary cross-linking was immersed in water, high adhesiveness between the foamed rubber layer and the metal plate was maintained.

The test results of the cross-cut method were supported by the evaluation results of the water absorption rate described above. That is, it was found that, even when the sealing material obtained by the two-step method including the preliminary cross-linking was brought into contact with a pressurized fluid to be sealed, the material exhibited excellent sealing property because the permeation of the fluid between the foamed rubber layer and the metal plate was effectively suppressed, and high adhesiveness between the foamed rubber layer and the metal plate was effectively maintained.

The invention claimed is:

1. A sealing material, comprising only one metal plate and a foamed rubber layer formed on both surfaces of the metal plate, wherein the metal plate has a thickness of from 0.1 to 0.3 mm, the foamed rubber layer has a closed cell rate of 50% or more, the foamed rubber layer is formed by foaming a rubber composition layer excluding a microcapsule-type foaming agent, and a surface of the foamed rubber layer has a maximum height Rz determined by a method in conformity to JIS B 0601-2001 of 40 μm or less.

2. The sealing material according to claim 1, wherein a result obtained by a test of a cross-cut method in conformity to JIS K5600-5-6 after immersion in water corresponds to Class 0, Class 1, or Class 2.

3. The sealing material according to claim 2, wherein the foamed rubber layer is formed by foaming a rubber composition layer including a thermally-degradable foaming agent.

4. The sealing material according to claim 3, wherein the foamed rubber layer is formed by heating a rubber composition layer formed on the both surfaces of the metal plate at a temperature equal to or higher than a cross-linking temperature and lower than a foaming temperature, and then heating the rubber composition layer at a temperature equal to or higher than the foaming temperature.

5. The sealing material according to claim 2, wherein the foamed rubber layer is formed by heating a rubber composition layer formed on the both surfaces of the metal plate at a temperature equal to or higher than a cross-linking temperature and lower than a foaming temperature, and then heating the rubber composition layer at a temperature equal to or higher than the foaming temperature.

6. The sealing material according to claim 1, wherein the foamed rubber layer is formed by foaming a rubber composition layer including a thermally-degradable foaming agent.

7. The sealing material according to claim 6, wherein the foamed rubber layer is formed by heating a rubber composition layer formed on the both surfaces of the metal plate at a temperature equal to or higher than a cross-linking, temperature and lower than a foaming temperature, and then heating the rubber composition layer at a temperature equal to or higher than the foaming temperature.

8. The sealing, material according to claim 1, wherein the foamed rubber layer is formed by heating a rubber composition layer formed on the both surfaces of the metal plate at a temperature equal to or higher than a cross-linking temperature and lower than a foaming temperature, and then heating the rubber composition layer at a temperature equal to or higher than the foaming temperature.

9. The sealing material according to claim 1, wherein the foamed rubber layer has a closed cell rate of 60% or more.

10. The sealing material according to claim 1, wherein the foamed rubber layer has a closed cell rate of 70% or more.

11. The sealing material according to claim 1, wherein the foamed rubber layer has a closed cell rate of 80% or more.

* * * * *